UNITED STATES PATENT OFFICE.

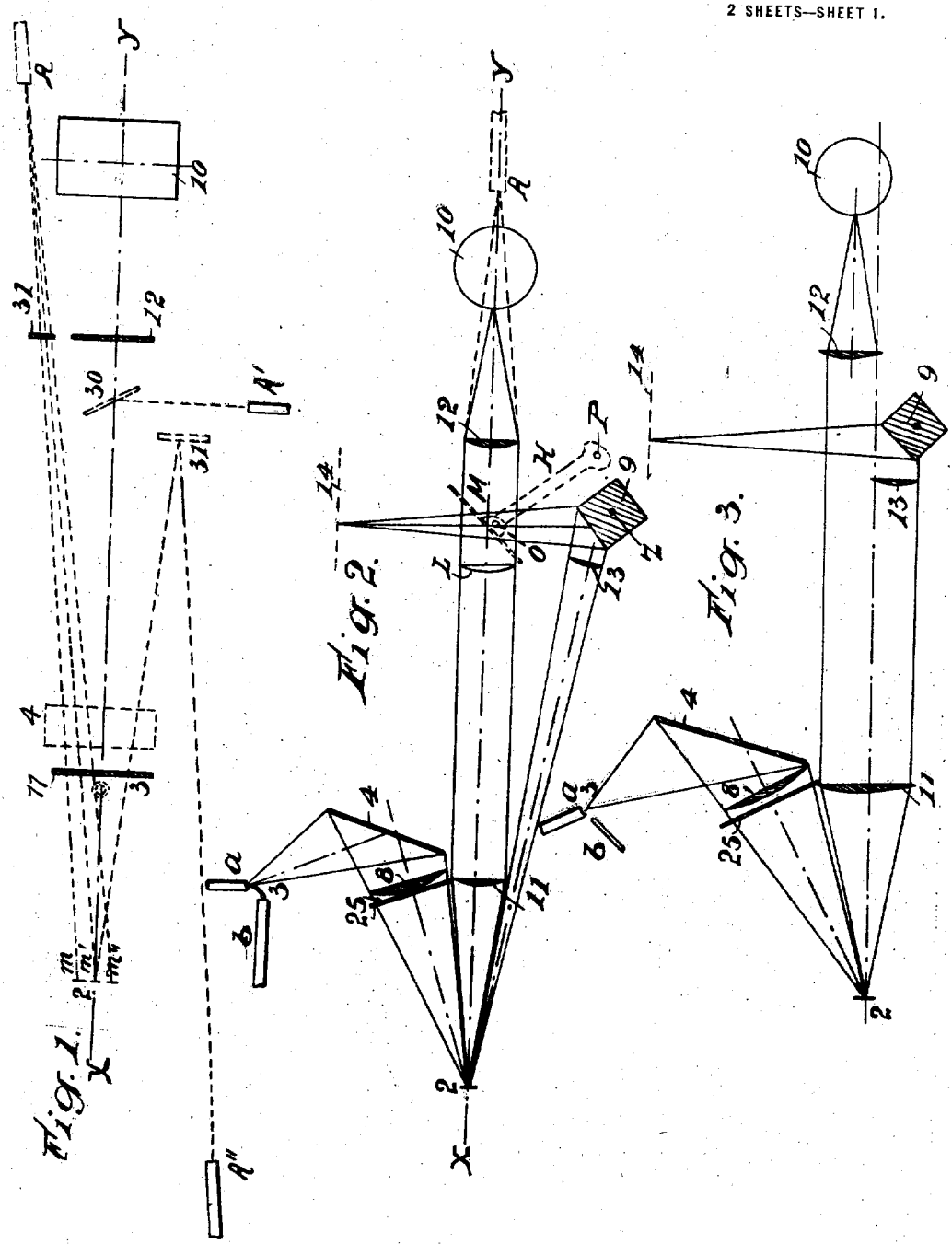

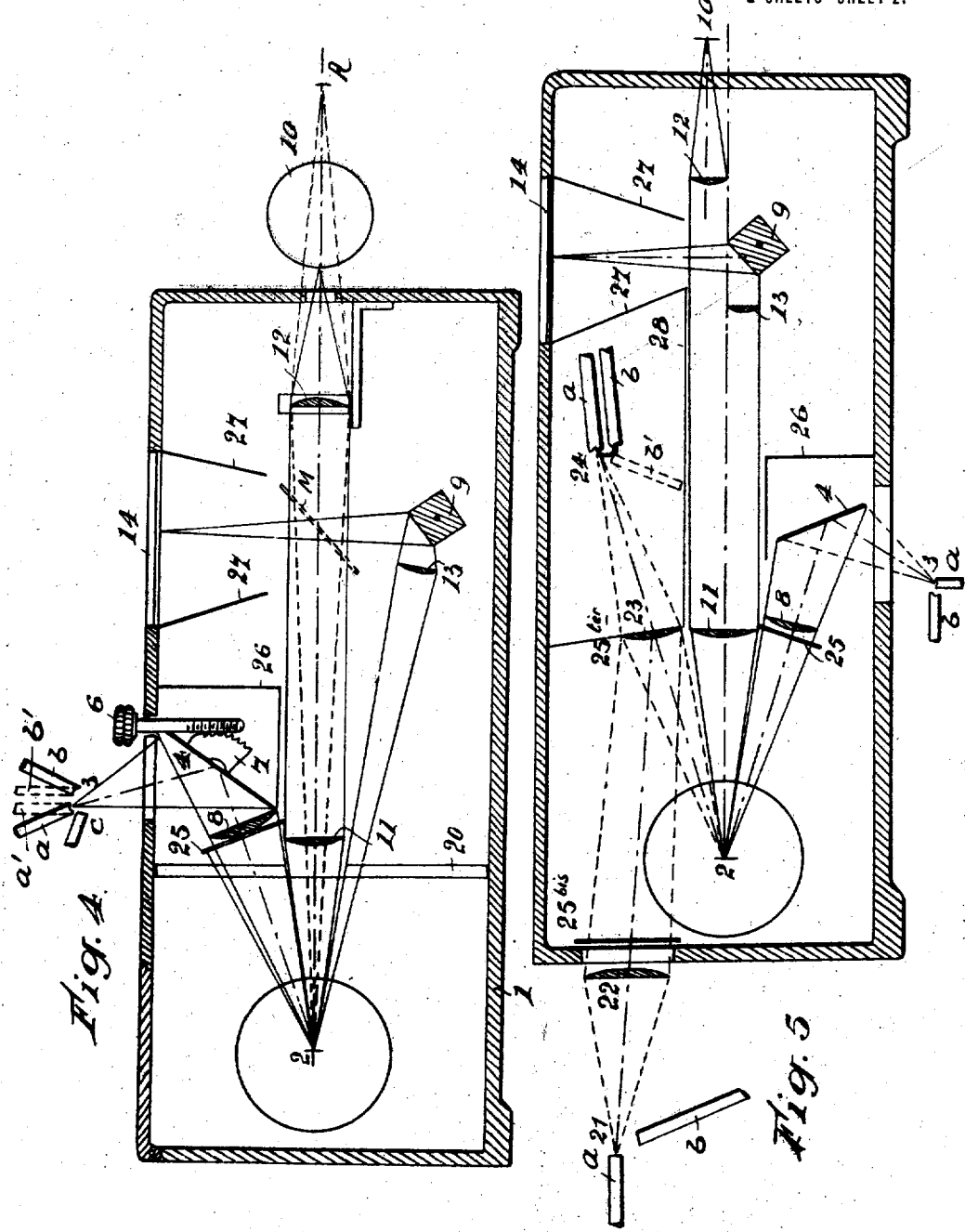

ANDRÉ E. BLONDEL, OF PARIS, FRANCE.

RAPID PHOTOGRAPHIC RECORD OF CURVES OF OSCILLOGRAPHS, RHEOGRAPHS, AND THE LIKE.

1,139,476.                    Specification of Letters Patent.        Patented May 18, 1915.

Application filed August 5, 1913. Serial No. 783,207.

*To all whom it may concern:*

Be it known that I, ANDRÉ E. BLONDEL, a citizen of the Republic of France, residing at Paris, France, have invented new and useful Improvements in and Relating to Rapid Photographic Records of Curves of Oscillographs, Rheographs, and the like; and I do hereby declare the following to be a full, clear, and exact description of the same.

In French specification No. 419118 are described various devices for direct observation of curves produced by the vibration of movable parts, while the recording of the curves themselves is effected by means of photographic apparatus placed at the back of a dark chamber.

In French additional patents are described various improvements of the photographic apparatus.

The object of the present invention is to improve the conditions in which the curves are observed, by a better arrangement of the electric lamp, which is used for lighting the mirrors of the recording apparatus, and by a device enabling a portion of the rays reflected by the said mirrors to be utilized for observing the curves while they are being photographed.

Figures 1 and 2 which show respectively in horizontal cross-section and in vertical section, the optical arrangement in a diagrammatic manner, will clearly show what constitutes the improvements and in what they differ from the arrangements already known for apparatus of this kind in which a photographic apparatus recorder is arranged opposite the apparatus the deflections of which are to be registered.

In order to simplify the matter, the said drawing shows a recording apparatus consisting of a simple cylinder 10 assumed to be covered with sensitized paper, but it is obvious that the device in question can be replaced by any other photographic arrangement bringing about quick movement of a photographic emulsion, that is to say, as described in French specification No. 419118. In the same way, the apparatus, the deflections of which are to be recorded, is represented here simply by small mirrors 2, each assumed to be oscillating about a vertical axis. Only one of these mirrors is shown in the vertical section (Fig. 2), while three of them, $m$, $m'$, $m''$, are shown in plan. In reality, they can be of any desired number and placed quite close to each other, so as to be easily lighted by one and the same source of light, the rays of which are isolated and directed by diaphragms having vertical slots 25.

In the apparatus described in French specification, No. 419118, the mirrors in question were lighted generally by an arc lamp, the crater of which is shown in Figs. 1 and 2 at A. This lamp is arranged at the side or at the back of the recording drum 10 and sends its rays through one or more cylindrical condenser lenses such as 31 and 11 with the axes of their cylindrical surfaces vertical (or through any other condenser system) on to the mirrors $m$. These rays are oblique relatively to the horizontal axis X Y of the apparatus. The result is that the apparatus is fairly cumbersome, and that various deformations can be produced by the obliquity of the rays passing through the lenses.

The rays refracted by the mirrors 2, are concentrated on the photographic emulsion by means of another cylindrical lens 12, in front of which it is advisable to interpose a first condenser lens 11, as explained in French specification No. 419118. But the arrangements which will be described according to the present invention, are also advantageously applicable even when the said lens 11 is done away with. In any case, whatever be the number of the lenses, care must be taken that the conjugate foci of the mirrors 2 should coincide with the photographic emulsion.

As already stated, the arrangement of the luminous source at A has disadvantages owing to the obliquity of the rays. The same is the case if the source of light is placed at A″ and the rays are directed onto the mirror 2 by means of an intermediate mirror 31, for in that case there would still be obliquity and unsymmetrical arrangement of the apparatus. Another solution which has also been tried, consists in placing the source of light at A′ in the horizontal plane passing through X Y and in sending the rays back to the mirror 2 by means of a mirror 30. But in that case, the mirror in question has to be removed at the moment when a photograph is taken on the drum 10, in order to allow the rays to pass.

The principle of the arrangement according to this invention, consists in the electric arc or source of light being placed on the left of the drum 10 in the figures, in the vertical plane passing through X Y, at a higher (or even lower) level than that of the mirror 2, and in the apparatus thus being rendered symmetrical, while still allowing the photographic recording to be effected at 10. Fig. 2 shows an example of this arrangement.

3 is the arc formed between the carbons $a$, $b$, arranged in any desired manner, but so that the crater of the positive carbon $a$ should project its rays effectively on a mirror 4 at a right angle to the plane of Fig. 2, which sends the pencil of rays, by means of a cylindrical lens 8 (or a spherical one, according to circumstances, not shown in Fig. 1), back to the mirror 2. The pencil of rays passes through a plate or diaphragm 25 normal to its axis and provided with one or more slots, in order to limit narrowly the pencils falling on the mirrors 2. Owing to the concentration by the cylindrical lenses 11, 12, each of the said pencils gives on the drum 10 an image forming practically a luminous point, the dimensions of which depend on the dimensions of the mirrors $m$, $m'$, $m''$. The characteristic feature of this arrangement is that the apparatus becomes perfectly symmetrical, the arc does not interfere with the operator who stands near the drum, and the luminous pencils pass through the lenses with the least possible obliquity.

In ordinary cases, the luminous rays sent back by the mirrors 2, will meet, as already explained with reference to Fig. 4 of the French specification No. 419118, a lens L and a mirror M oscillating about an axis $o$, so as to produce an image on opaque glass 14 (the image could also be observed by looking direct at the oscillating mirror, or the said mirror could be replaced by a rotating "spiraloid" drum of the Siemens type). At the moment of taking the photograph, the lens L and the mirror M are lowered by means of a lever K movable about an axis P. This operation proves disadvantageous.

A second improvement according to this invention consists therefore in avoiding the use of this oscillating mirror and of the manipulation which it requires. To that end, a portion of the incident rays falling on the mirrors 2, is sent back separately on to a cylindrical lens 13 and falls on a mirror 9 which can be either oscillating like the mirror M (see Fig. 4 of the French specification No. 419118) or rotating about an axis Z. In that case, a polygonal mirror is preferably used. Thus Fig. 2 shows a mirror with four silvered faces, for the purpose of obtaining greater continuity in lighting.

Fig. 3 shows a modification of Fig. 2, in which the pencil sent back to the lens 13, passes first through the lens 11 which is given a greater height. It forms thus a portion of the large principal pencil sent back by the lens 11, and it is a portion of the said large pencil which is sent back to the rotating or oscillating mirror. In both cases, as will be seen (Figs. 2 and 3), it is possible to observe the rays sent back by the mirror 9, while the photograph is being taken by means of the rays condensed by the lens 12.

Fig. 4 shows a practical method of carrying out the invention. A case 1 (for instance of metal, closed at each side by shutters of wood or metal) contains the galvanometric system 2. The latter receives the light of a suitable arc lamp 3, so as to send the rays on to the mirror 4. The inclination of the latter is adjusted by means of a screw 6 for instance acting on a toothed quadrant 7 or on a suitable lever. The mirror being pressed against the end of the screw by means of a spring, the rays are sent back by the mirror 4 to the galvanometers 2, passing through the lens 8. A portion of the pencil of rays is sent back to the recorder 10 by the cylindrical lenses 11 and 12 (or by the lens 12 alone, if a single lens system is used). Another portion is sent back by the cylindrical lens 13 to the rotating or oscillating mirror 9.

Fig. 5 shows several other modifications of the process for lighting the mirrors 2. First of all, a modification shows the mirror 4 and the lens 8 arranged below the reflected pencil, and not above the same, the arc producing the lighting being placed at 3, below the case, but still in the vertical plane of the axis of the apparatus. Another modification is shown on the left of the figure. An arc is produced at 21 and lights a cylindrical (or spherical, according to circumstances) lens 22, which sends a pencil of rays through a system of slots 25 *bis* on to a mirror 23 which is silvered on the right hand side and which can be formed, according to circumstances, by a glass plate with a flat face, or on the contrary by a cylindrical lens silvered on its right face; the curves of the lens 22 and the mirror 23 produce vertical concentration of rays of the arc on the mirrors. Finally, a third modification consists in the use of a cylindrical lens 23, none of the faces of which is silvered, and which concentrates on the mirrors 2 of the rays coming from the craters of an arc 24 formed between two carbons $ab$ or $ab'$. These rays pass through the system of slots 25 *ter*.

In the preceding figures, 26, 27 and 28, represent opaque partitions, for the purpose of protecting the photographic recording apparatus from the light coming from the arc or the observation screen 14. The carbons of the arc lamp could be arranged in various manners, as shown, by way of non-limitative examples, in Figs. 1-4, and the mechanism of the arc lamp may also be any desired. In Fig. 4, it has been assumed that one or the other of the carbons is retained by a stop finger c, of refractory material, which makes it possible to do away with the whole mechanism of the lamps, as the advance takes place gradually in accordance with the consumption. In order to facilitate this method, are preferably used two parallel carbons a', b', suitably secured at the top in a double carbon holder which is suitably guided by guide rods, which reduces the arc lamp to its simplest construction.

Having fully described my invention, what I claim and desire to secure by Letters Patent is:—

1. In a photographic recorder for oscillographs, rheographs and like instruments, the combination, with the mirror of the instrument, of a source of light; a movable means for carrying a light-sensitive surface; a lens between said source and said mirror for concentrating rays on the latter; a pair of lenses adapted to concentrate, upon the light sensitive surface, a portion of the bundle of rays reflected from the mirror; a screen; a moving reflector; and a lens adapted to transmit to said last named reflector a portion of said bundle of light to said moving reflector, whence it is condensed on said screen.

2. In a photographic recorder for oscillographs, rheographs and like instruments, the combination, with the mirror of the instrument, of a source of light; a movable means for carrying a light sensitive surface; a lens and slit between said source and said mirror for limiting and concentrating rays on the latter; a pair of lenses adapted to concentrate, upon the light sensitive surface, a portion of the bundle of rays reflected from the mirror; a screen; a moving reflector; and a cylindrical lens adapted to transmit to said last named reflector a portion of said bundle of light to said moving reflector, whence it is condensed on said screen, the bundles of rays incident on and reflected from said mirror lying in nearly the same plane and forming between each other the most acute practicable angle.

3. In a photographic recorder for oscillographs, rheographs and like instruments, the combination, with the mirror of the instrument, of a source of light; a movable means for carrying a light sensitive surface; a lens and slit between said source and said mirror for concentrating rays of the latter; a pair of cylindrical lenses adapted to concentrate, upon the light sensitive surface, a portion of the bundle of rays reflected from the mirror; a screen; a moving reflector; and a cylindrical lens adapted to transmit to said last named reflector a portion of said bundle of light to said moving reflector, whence it is condensed on said screen, the bundle of rays incident on and reflected from said mirror lying approximately in the same plane.

4. In a photographic recorder for oscillographs, rheographs and like instruments, the combination, with the mirror of the instrument, of a source of light; a movable means for carrying a light sensitive surface; a reflector adapted to reflect light rays from said source; a condensing means for concentrating the rays from said reflector onto the mirror, whence the rays are again reflected; means for condensing one portion of the bundle of again reflected rays upon said light sensitive surface; a condensing means adapted to transmit another portion of said again reflected rays; a screen; and a movable reflector for reflecting the rays from said last named condensing means onto said screen.

5. In a photographic recorder for oscillographs, rheographs and like instruments, the combination, with the mirror of the instrument, of a source of light; a movable means for carrying a light sensitive surface; a reflector adapted to reflect light rays from said source; a condensing means for concentrating the rays from said reflector onto the mirror, whence the rays are again reflected; means for condensing one portion of the bundle of again reflected rays upon said light sensitive surface; a condensing means adapted to transmit another portion of said again reflected rays; a screen; and a movable reflector for reflecting the rays from said last named condensing means onto said screen, the angle between the axes of the bundle of rays incident to and reflected from said mirror being as acute as practicable.

6. In a photographic recorder for oscillographs, rheographs and like instruments, the combination, with the mirror of the instrument, of a source of light; a movable means for carrying a light sensitive surface; a reflector adapted to reflect light rays from said source; a condensing means for concentrating the rays from said reflector onto the mirror, whence the rays are again reflected; means for condensing one portion of the bundle of again reflected rays upon said light sensitive surface; a condensing means adapted to transmit another portion of said again reflected rays; a screen; and a movable reflector for reflecting the rays from said last named condensing means onto said screen, an active point of each condensing means, reflector, mirror and light sensitive surface lying approximately in a common plane.

7. In a photographic recorder for oscillographs, rheographs and like instruments, the combination, with the mirrors of a plurality of instruments, of a source of light; a movable means for carrying a light sensitive surface; a reflector adapted to reflect light rays from said source; a condensing means for concentrating separate bundles of rays from said reflector onto each of the mirrors, whence the rays are again reflected; means for condensing one portion of the bundles of again reflected rays upon said light sensitive surface; a condensing means adapted to transmit another portion of said again reflected rays; a screen; and a movable reflector for reflecting the rays from said last named condensing means onto said screen, an active point of each condensing means, reflector, mirror and light sensitive surface lying nearly in a common vertical plane for each of the separate bundles of rays.

In testimony whereof, I have signed my name to this specification in the presence of two subscribing witnesses.

ANDRÉ E. BLONDEL.

Witnesses:
ANGÈLE BOUCHERON,
FRANK H. MASON.